United States Patent Office.

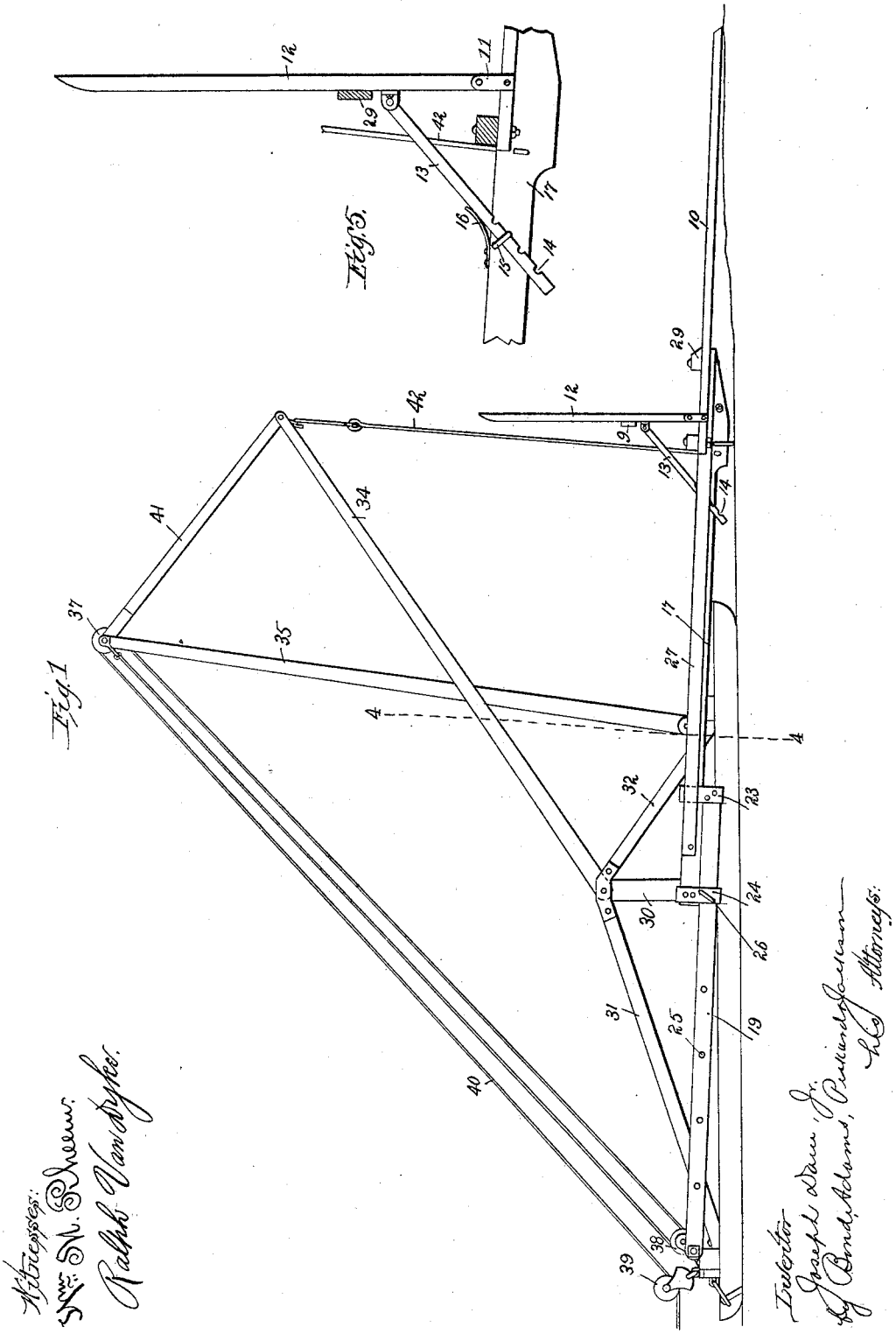

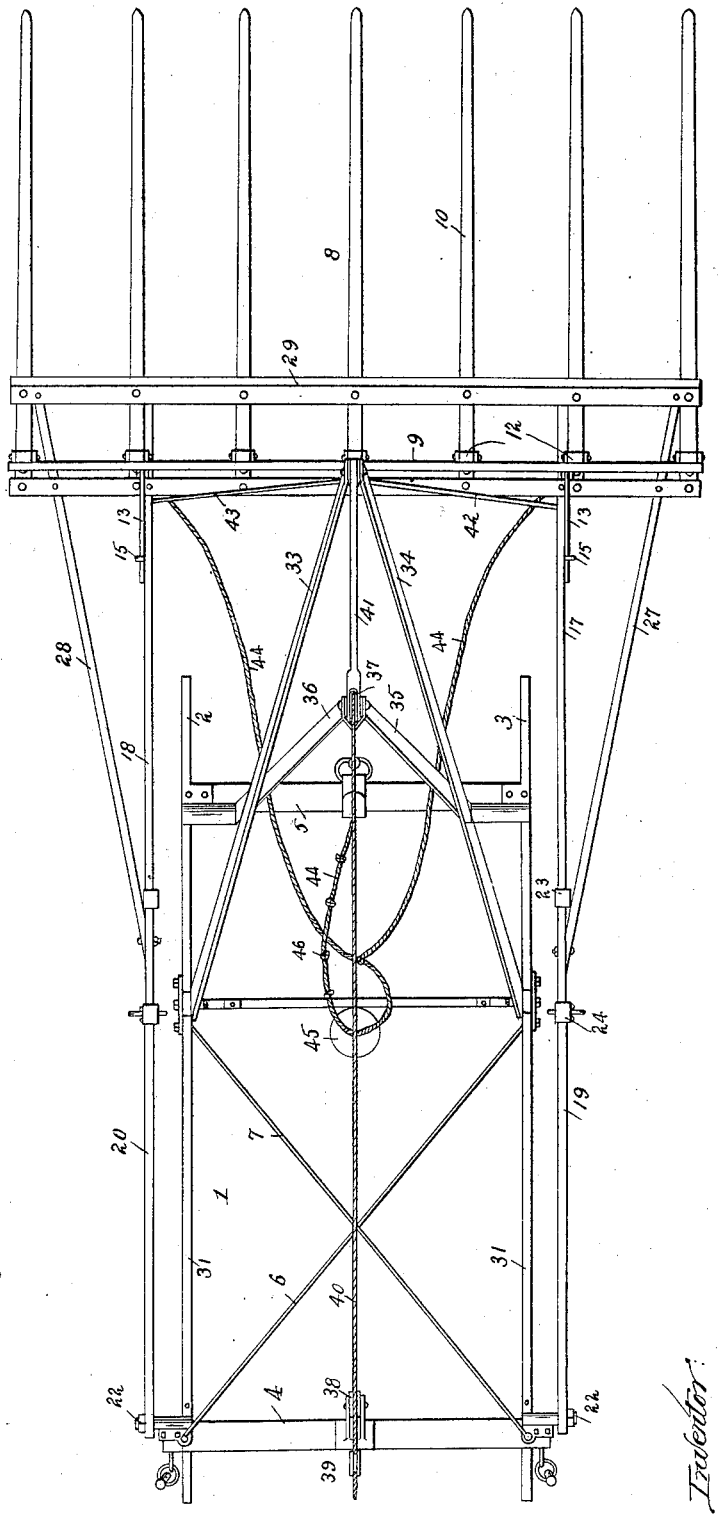

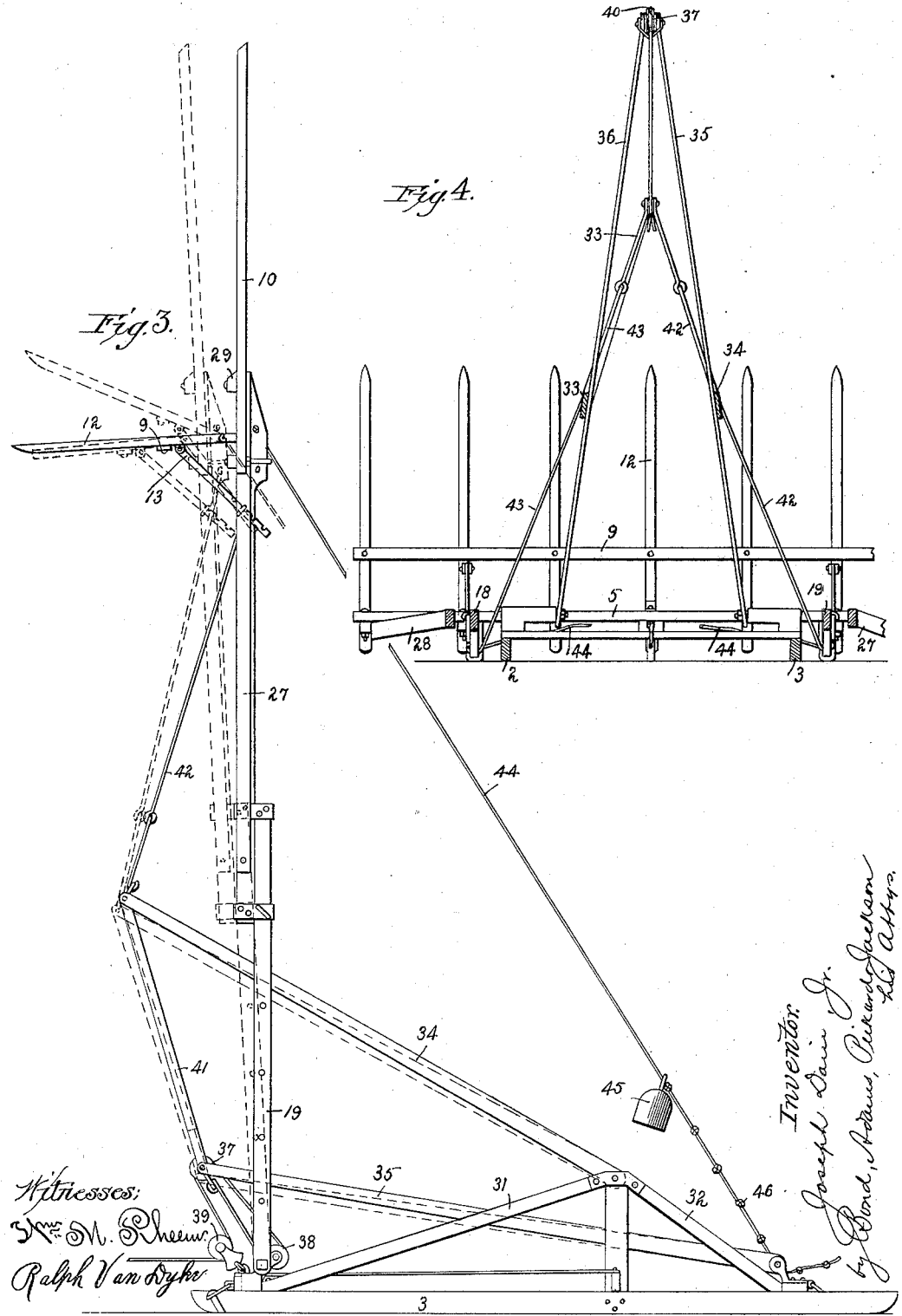

JOSEPH DAIN, JR., OF CARROLLTON, MISSOURI, ASSIGNOR TO THE DAIN MANUFACTURING COMPANY, OF SAME PLACE.

HAY-STACKER.

SPECIFICATION forming part of Letters Patent No. 608,653, dated August 9, 1898.

Application filed April 10, 1893. Serial No. 469,834. (No model.)

*To all whom it may concern:*

Be it known that I, JOSEPH DAIN, Jr., a citizen of the United States, residing at Carrollton, in the county of Carroll and State of Missouri, have invented a certain new and useful Improvement in Hay-Stackers, of which the following is a specification, reference being had to the accompanying drawings, in which—

Figure 1 is a side elevation. Fig. 2 is a top or plan view. Fig. 3 is a side elevation showing the carrier-frame elevated. Fig. 4 is a vertical cross-section on line 4 4 of Fig. 1, and Fig. 5 is an enlarged detail showing the manner in which the movable carrier-frame is adjusted.

My invention relates to hay-stackers, and particularly to that class in which the hay is placed upon a pivoted carrier, which is then raised to an upright position by means of an elevating-frame.

As heretofore constructed a great deal of power has been required to raise the carrier-frame during the first part of the operation of raising it from its horizontal position, owing to the fact that in implements of this class horse-power is generally used, and the system of levers used to change the direction of the pull has resulted in a loss of power through the decrease of leverage.

My invention has for its object to provide a stacker in which the power required will be more nearly uniform throughout the entire operation of raising the stacker from a horizontal to a vertical position and in which less power will be required.

I accomplish this object as hereinafter specified and as illustrated in the drawings. That which I regard as new will be set forth in the claims.

In the drawings, 1 indicates a supporting-frame, consisting of runners 2 3, connected by end pieces 4 5 and braces 6 7, as shown in Fig. 2.

8 indicates the carrier-frame, consisting of a head 9, carrying teeth 10 and pivotally supporting a head 11, carrying teeth 12. The teeth 12 may be arranged at any desired angle to the teeth 10 and are held in position by bars 13, provided with notches 14, which bars pass through staples 15, as shown in Fig. 5. The notches 14 of each bar are adapted to engage one edge of the corresponding staple 15 to hold the bar in position.

16 indicates a spring adapted to bear against the bar 13 and hold it in contact with one edge of the staple 15, whereby the bar 13 will be held in position.

The head 9 is supported by bars 17 18, one at each side of the machine, the free ends of which bars are connected to bars 19 20, which are pivoted by pivots 21 22 to the rear end of the frame 1, as best shown in Fig. 2. The bars 17 18 are connected to the bars 19 20, respectively, by clips 23 24, the clips 23 being secured to the bars 19 20 and the clips 24 to the bars 17 18. By this means the bars 17 18 may be adjusted longitudinally of the bars 19 20 to increase or diminish the distance of the head 9 from the pivots 21 22 and thereby increase or diminish the height to which the head will be moved in stacking. The bars 19 20 are provided with holes 25, adapted to receive pins 26, carried in the clips 24, by means of which the bars may be secured in position.

27 28 indicate braces bracing the bars 17 18 and the head 9.

29 indicates a bracing-rod which extends transversely of the teeth 10, as shown in Fig. 2.

30 indicates standards, one of which is placed at each side of the frame 1 and is rigidly held in position by braces 31 32, which braces are connected at their lower ends to the runners 2 3, thus making a truss-frame to support the elevating-frame.

33 34 indicate bars which constitute a lifting-frame. The lower ends of the bars 33 34 are pivoted to the standards 30, one at each side of the frame 1, and the bars are inclined toward each other and connected at their upper ends, as best shown in Fig. 2, thereby forming a lever supported at each side of the machine.

35 36 indicate bars similar to the bars 33 34, constituting a second lifting-frame. The bars 35 36 are pivoted in the frame 1 forward of the pivotal point of the bars 33 34 and are inclined toward each other and are united at their upper ends, as best shown in Fig. 2, being so arranged as to be adapted to move freely between the bars 33 34, as shown in the drawings. The upper ends of the bars 33 34 and 35 36 are connected by a bar 41 in such manner than the upper ends of the bars 35 36 will lie back of the upper ends of the bars 33 34, as shown in Fig. 1.

37 indicates a pulley pivotally mounted at the upper ends of the bars 35 36, as shown in Fig. 1.

38 indicates a pulley supported upon the cross-bar 4 at the rear of the frame 1, as shown in Figs. 1 and 2.

39 indicates another pulley, also secured to the cross-bar 4.

I do not wish to limit myself to the manner shown of mounting the pulleys 38 39, as they may be otherwise supported, if desired.

40 indicates a rope passing around the pulleys 37 38 39 for raising the bars 33 34.

42 43 indicate rods the upper ends of which are connected to the upper ends of the bars 33 34, their lower ends being connected to the rods 17 18, respectively, near the head 9.

44 indicates a rope, one end of which is connected to the forward part of the frame 1, its other end being connected to the head 9. The length of the rope is such as to permit of the elevation of the head 9 to the proper height.

45 indicates a weight mounted upon the rope 44. The rope 44 is provided at its lower end with a number of knots 46, by means of which it may be lengthened or shortened, the knots being adapted to be engaged by a hook carried by the frame 1. By this arrangement the height which the head 9 may be raised can be regulated. The weight 45 serves to cause the carrier-frame to descend after the lifting-cord 40 is slackened.

The parts being in the position shown in Fig. 1, a load of hay is placed upon the carrier-frame. By then pulling upon the rope 40 the carrier-frame will be lifted in the arc of a circle until it is stopped by the rope 44. I prefer to raise the carrier-frame until the bars 17 arrive at a substantially vertical position, but the extent to which it is moved may be varied. I also prefer to arrange the teeth 12 at about a right angle to the teeth 10; but this arrangement may also be varied. By pulling upon the rope 40 the power will be transmitted through the bars 35 36 and the bar 41 to the bars 33 34 and thence through the rods 42 43 to the carrier-frame. By this means when the carrier-frame is in a horizontal position almost a direct vertical pull is secured, which greatly diminishes the power required to lift the frame. As the carrier-frame is lifted the bars 35 36 will move within the bars 33 34, and when the carrier is at its highest point the said bars will assume the position shown in Fig. 3.

By the peculiar arrangement of the lifting-bars the direction in which the force is transmitted from the lifting-rope 40 to the carrier-frame is so regulated that during the first part of the lifting operation the power will be exerted almost at right angles to the carrier-frame, and at the same time the power will be exerted upon the pulley 37 at about an angle of forty-five degrees, and it will therefore be very effective for lifting purposes.

I do not wish to limit myself to constructing the bars 33 34 and the bars 35 36 specifically as shown, as they may be differently constructed without departing from the spirit of my invention, the advantage of using the two bars to form each lever being that swaying is avoided and the machine is made steadier.

The most important feature of my invention consists of the use of two pivoted lifting-levers arranged, as described, with their ends connected, whereby the power applied will be transmitted and applied to the carrier-frame at an angle most favorable to secure the best results, at the same time providing for the application of such power to such lifting-bars at a greater angle than has heretofore been possible in any construction known to me.

That which I claim as my invention, and desire to secure by Letters Patent, is—

1. The combination with supporting devices, a carrying-frame, and pivoted supports therefor, of pivoted lifting-levers connected to each other at their upper ends, one of said levers being connected to the carrying-frame, and mechanism for operating said levers to lift the carrying-frame, substantially as described.

2. The combination with supporting devices, a carrying-frame, and pivoted supports therefor, of lifting-levers arranged at an angle to each other, the upper ends of said levers being connected, the upper end of one of said levers being connected to the carrying-frame, and mechanism for operating said lifting-levers, substantially as described.

3. The combination with supporting devices, a carrying-frame, and pivoted supports therefor, of lifting-levers pivoted at different heights and arranged at an angle to each other, the upper ends of said levers being connected, the upper end of one of said levers being connected to the carrying-frame, and mechanism for operating said lifting-levers, substantially as described.

4. The combination with supporting devices, a carrying-frame, and pivoted supports therefor, of a pivoted lifting-lever 33 34, the upper end of which is connected to said carrying-frame, lifting-lever 35 36 pivoted at its lower end forward of the pivot of said lever 33 34, devices connecting the upper ends of said levers, and rope-and-pulley mechanism for operating said levers to lift the carrying-frame, substantially as described.

5. The combination with a frame 1, a carrying-frame pivotally supported thereby and adapted to be raised in the arc of a circle, of a lifting-lever, consisting of two bars 33 34, pivotally supported by the frame 1, devices connecting the upper end of said lifting-lever to the carrying-frame, a second lifting-lever, consisting of bars 35 36 pivotally supported by the frame 1, devices connecting the upper ends of said two lifting-levers, and rope-andpulley mechanism for operating said levers to lift the carrying-frame, substantially as described.

6. The combination with supporting devices, of an extensible and pivotally-supported carrier-frame adapted to be lifted in the arc of a circle, and lever mechanism connected with the carrier-frame and adapted for the application of lifting power to the said carrier-frame at an angle thereto, substantially as described.

7. The combination with a supporting-frame, of a carrier-frame provided with pivoted supports and having the bars 17, 18, the bars 19, 20 pivoted to the supporting-frame, devices for adjustably connecting the bars 17, 18 with the bars 19, 20, respectively, and lever mechanism for lifting the said carrier-frame in the arc of a circle, substantially as described.

8. The combination with a supporting-frame, and a pivotally-supported carrier-frame, of the adjustably-connected bars 17, 18, and 19, 20, attached to said frames, respectively, and lever mechanism for lifting the carrier-frame in the arc of a circle, substantially as described.

9. The combination with runners 2, 3 of standards 30 thereon, braces 31, 32 connected to said standards and to said runners, thereby forming a truss-frame, a carrier-frame pivotally supported on the runners, and lever mechanism supported by said truss-frame and runners and adapted for elevating and lowering the carrier-frame, substantially as described.

10. The combination with supporting devices, and a truss-frame thereon, of a carrier-frame pivoted to said supporting devices, and lever mechanism pivotally connected with the truss-frame and with the supporting devices respectively and adapted for elevating and lowering the carrier-frame, substantially as described.

11. The combination with the runners provided with standards and braces, a carrier-frame, and pivoted supports therefor, of lifting-levers arranged at an angle to each other and connected at their upper ends, means for connecting the upper end of one of said levers to the carrying-frame, and operating mechanism for said lifting-levers, substantially as described.

12. The combination with a runner-frame, and an extensible and pivotally-supported carrier-frame, of lifting-levers pivotally supported by the runner-frame and connected together at their upper ends, devices connecting the upper end of one of said lifting-levers to the carrier-frame, and rope-and-pulley mechanism for operating said lifting-levers to raise the carrier-frame in the arc of a circle, substantially as described.

JOSEPH DAIN, JR.

Witnesses:
JOHN L. JACKSON,
RALPH J. VAN DYKE.